(12) United States Patent
Schellings

(10) Patent No.: US 7,931,438 B2
(45) Date of Patent: Apr. 26, 2011

(54) ACTIVE TOWER DAMPER

(75) Inventor: Vincent Schellings, Enschede (NL)

(73) Assignee: General Electric Company, Schenectady, NY (US)

( * ) Notice: Subject to any disclaimer, the term of this patent is extended or adjusted under 35 U.S.C. 154(b) by 848 days.

(21) Appl. No.: 11/609,939

(22) Filed: Dec. 13, 2006

(65) Prior Publication Data

US 2008/0145222 A1 Jun. 19, 2008

(51) Int. Cl.
*F01D 25/04* (2006.01)
(52) U.S. Cl. ............... 416/1; 415/4.3; 415/119; 416/145
(58) Field of Classification Search ............... 415/4.3, 415/119; 416/145, DIG. 6
See application file for complete search history.

(56) References Cited

U.S. PATENT DOCUMENTS

| | | |
|---|---|---|
| 6,695,588 B1 | 2/2004 | Nielsen |
| 2006/0033338 A1 | 2/2006 | Wilson |
| 2006/0147306 A1 | 7/2006 | Zheng et al. |
| 2007/0110578 A1* | 5/2007 | Stommel ............... 416/132 B |

FOREIGN PATENT DOCUMENTS

| | | |
|---|---|---|
| DE | 10309825 A1 | 9/2004 |
| EP | 1008747 A | 6/2000 |
| EP | 1008747 A2 | 6/2000 |
| WO | WO 9521327 A1 * | 8/1995 |

OTHER PUBLICATIONS

"Reducing Dynamic Loading of Towers: Application of Tuned Liquid Column Dampers in Wind Turbines", by Arnold Wilmink and Ferdy Hengeveld, Mecal, The Nethelands, an article from Windtech International. Nov./Dec. 2006.
European Search Report issued in connection with corresponding EP Patent Application No. 07122726 on Nov. 25, 2009.

\* cited by examiner

*Primary Examiner* — Igor Kershteyn
(74) *Attorney, Agent, or Firm* — GE Global Patent Operation; Peter T. DiMauro

(57) ABSTRACT

A damper system for damping vibrations of a wind turbine having a tower, a nacelle, and at least one rotor blade is provided. The damper system includes a mass for damping vibrations of a wind turbine and at least one actuator adapted for actively controlling the mass, wherein the at least one actuator is connected to a portion of the wind turbine and to the mass.

18 Claims, 5 Drawing Sheets

ACTIVE TOWER DAMPER

BACKGROUND OF THE INVENTION

The present invention relates to wind turbines. Particularly, the invention relates to a system for reducing tower vibration and a method of damping tower vibrations. Specifically, the invention relates to a damper system for damping vibrations of a wind turbine, a system for reducing vibrations of a wind turbine and a method for reducing vibrations of a wind turbine.

Wind turbines increase in size and power that is provided by the wind turbine. Thereby, loads and stress on the construction parts, like the tower of the wind turbine, also increases. A compensation of the loads on the tower by providing additional material strength increases the required amount of material and, thus, the costs. Thus, a compensation of the additional loads by stronger and more materials to withstand the loads reduces the competitiveness of wind turbines as compared to other ways of generating energy.

Tower dampers for damping vibrations of the tower may reduce the stress. As a result, the tower can be constructed with a reduced strength and material can be saved to reduce costs. However, the mass required for a passive tower vibration damping is also increasing in the event that the increasing size and output of wind turbines result in increasing loads of the tower.

BRIEF DESCRIPTION OF THE INVENTION

In view of the above, according to one embodiment, a damper system for damping vibrations of a wind turbine having a tower, a nacelle, and at least one rotor blade is provided. The damper system includes a mass for damping vibrations of a wind turbine, at least one actuator adapted for actively controlling the mass, wherein the at least one actuator is connected to a portion of the wind turbine and to the mass.

Further embodiments, aspects, advantages and features are apparent from the dependent claims, the description and the accompanying drawings.

According to yet another embodiment, a system for reducing vibrations of a tower of a wind turbine is provided. The system includes a mass being movable with respect to the tower of the wind turbine, and a drive mechanism for actively controlling the mass movement with respect to the tower of the wind turbine.

Further embodiments refer to wind turbines including damper systems and systems for reducing wind turbine vibrations as described herein. Yet, embodiments are also directed to wind parks including a plurality of wind turbines, wherein wind turbines include damper systems and systems for reducing wind turbine vibrations as described herein.

According to another embodiment, a method for reducing vibrations of a wind turbine is provided. The method includes controlling the movement of a mass with respect to the wind turbine, the mass being located within the wind turbine, wherein the mass is actively controlled by a drive mechanism accelerating (???) the mass with respect to the wind turbine.

BRIEF DESCRIPTION OF THE DRAWINGS

A full and enabling disclosure of the present invention including the best mode thereof, to one of ordinary skill in the art is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the Fig.s. Each example is provided by way of explanation of the invention and is not meant as a limitation of the invention. For example, features illustrated or described as part of one embodiment can be used on or in conjunction with other embodiments to yield yet a further embodiment. It is intended that the present invention includes such modifications and variations.

Modern wind turbines experience an increase in size, which includes an increasing rotor diameter. Thereby, loads on the components of the wind turbine increase as well. This also relates to the tower of the wind turbine, which includes a significant portion of the mass of the entire wind turbine. As a result, in an attempt to withstand the increasing loads by providing stronger or additional materials, the tower experiences the largest increase in mass.

According to embodiments described herein, the loads on the tower can be reduced by providing an active mass damper for the tower. As a result, the loads can be reduced. Thereby, the material strength of the wind turbine or wind turbine components, e.g., the tower, does not need to be increased or may even be reduced.

Figure 1:
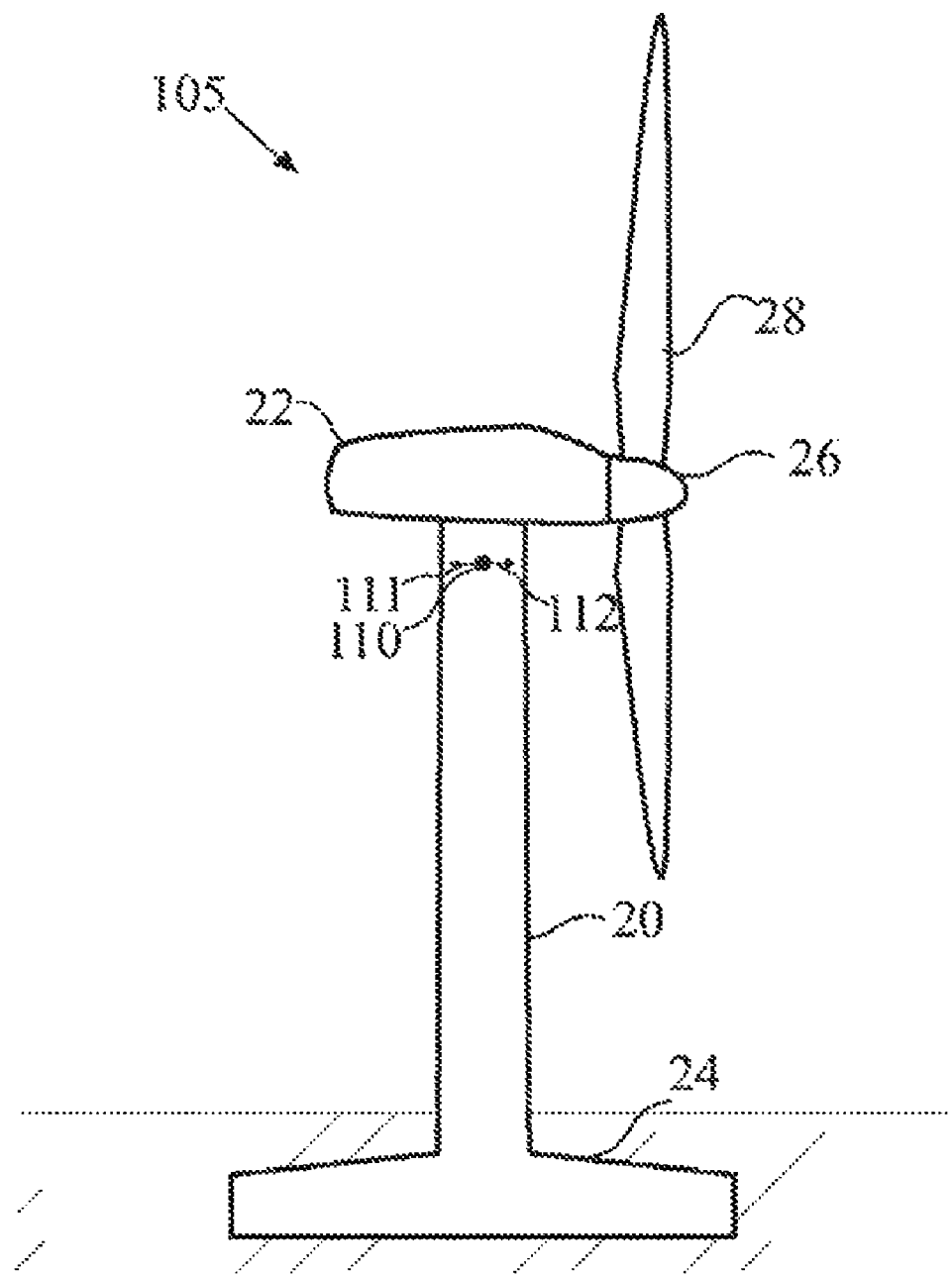
FIG. 1 shows a schematic drawing illustrating a wind turbine including an actively controlled mass damping system in a top portion of the tower of the wind turbine according to embodiments described herein.

According to one embodiment, as shown in FIG. 1, a wind turbine 105 includes a tower 20, which is mounted on a foundation 24. On top of the tower 20 there is a nacelle 22. Hub 26 is mounted to the nacelle and carries the rotor blades 28. The wind turbine 105 includes three rotor blades 28. According to other embodiments one, two, or four rotor blades may be included in the wind turbine.

According to one embodiment, the wind turbine 105 is a horizontal axis wind turbine, as shown in FIG. 1. However, according to other embodiments, other types of wind turbine, for example, a wind turbine with the vertical axis may be used.

As shown in FIG. 1, a lumped mass 110 is attached at the top of the tower 20. As indicated by arrows 111 and 112, actuators are provided in order to effectively control the position, velocity, and acceleration of the lumped mass 110. The actuators provide drive mechanisms to actively control the position, velocity and/or acceleration of the mass with respect to the wind turbine and the tower, respectively.

According to one embodiment, the actuators, which are connected to the mass 110, control the movement of the mass by hydraulic actuators. According to another embodiment, electrical actuators or a combination of hydraulic and electric actuators are used. Additionally, according to a further embodiment, a gear or a lever may be provided to control the movement of the mass actively by the actuators. However, levers or gears are not necessarily provided.

The movement of the mass 110 is controlled by the actuators, as indicated by arrows 111 and 112, in such a way that it reduces vibrations of the tower 20 of the wind turbine 105. Thereby, according to one embodiment, generally the mass is controlled such that it opposes the tower vibrations.

The actively controlled lumped mass damps, or reduces the tower vibration. This reduces the static and dynamic stress of the tower, for example, the tower shell and the like. As a consequence, the weight of the tower can be reduced as compared to a similarly sized wind turbine without actively controlled damping mass.

According to embodiments described herein, by controlling the mass 110 actively, it is possible to deploy a smaller mass as compared to passive mass dampers. The smaller lumped mass results in a reduction of costs, the reduction of occupied space, and an improvement in reaction times of the mass damper. On one hand, the mass is actively controllable. On the other hand, the inertia of the small mass also provides a faster reaction of the actively controlled mass damper as compared to a passive damper.

Generally, the mass can be provided in the form of weights made of materials with a sufficiently high density so that the dimensions of the weight do not need to be excessive. This may be realized by materials like concrete, stone materials, iron, steel, or steel alloys. According to further embodiments, the mass can be regularly shaped in the form of plates, cylinders, or plates. Alternatively, the mass may be irregularly shaped with protrusions, recesses and openings. This can, e.g., be used if a ladder or the like is provided in the tower and a technician needs to pass by the mass in order to get to the nacelle.

According to one embodiment, the actively controlled lumped mass can reduce vibrations of the tower and/or the entire wind turbine, particularly at frequencies of 20 Hz or below 20 Hz. According to another embodiment, frequencies in the range of 0.1 to 10 Hz can be reduced with the actively controlled mass damper.

As described above, an active control of the mass damper can be used to reduce the size of a lumped mass. According to one embodiment, the mass may be 100 kg to 3000 kg. According to another embodiment, the mass may be 200 kg to 400 kg. Generally, the size of the lumped mass depends on the size of the wind turbine. Thereby, according to one embodiment, the lumped mass may be 100 kg/MW to 1000 kg/MW per wind turbine power output. For example, the mass can also be within 200 kg/MW to 500 kg/MW.

Figure 2:
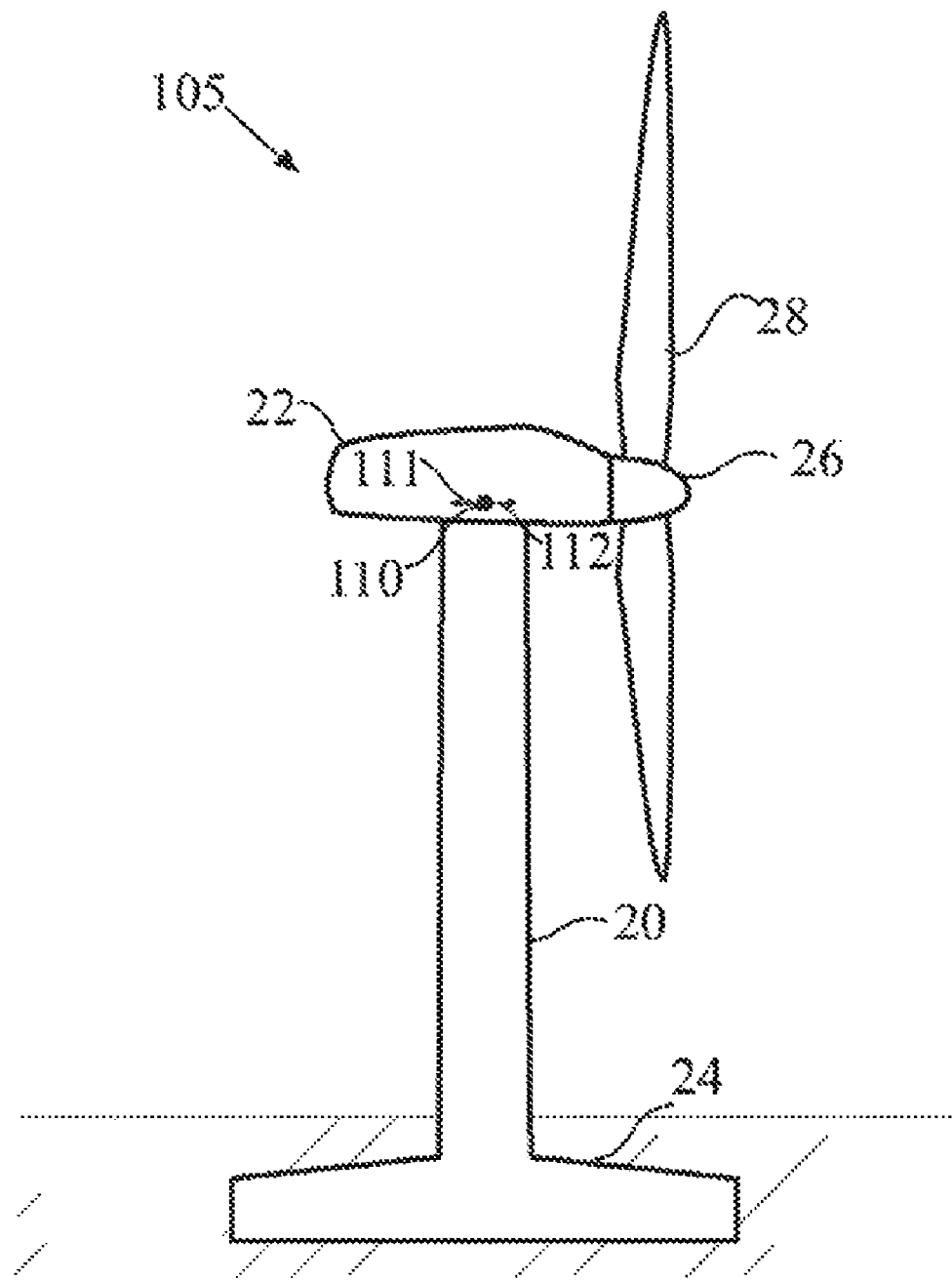
FIG. 2 shows a schematic drawing illustrating a wind turbine including an actively controlled mass damping system in a nacelle of the wind turbine according to embodiments described herein.

Within FIG. 1, the mass 110 is provided in the upper part of the tower 20. The mass is typically provided close to the top portion of the tower. According to another embodiment, as shown in FIG. 2, the actively controlled mass 110 is provided in the nacelle 22. As described with respect to FIG. 1, the nacelle 22 of wind turbine 105 is mounted on the tower 20. The rotor blades 28 are connected to the nacelle via hub 26.

Similarly to the embodiments described with respect to FIG. 1, the embodiments described with respect to FIG. 2 may also be employed to reduce vibrations of the wind turbine, particularly the tower 20, by the actively controlled lumped mass 110. Arrows 111 and 112 indicate the active control of the movement of the mass 110 by actuators or the like.

According to even further embodiments, the actively controlled mass may also be provided at further positions within the wind turbine. This can be for example a center portion of the tower 20, other portions of the tower, or other locations within the nacelle 22.

Figure 3A:
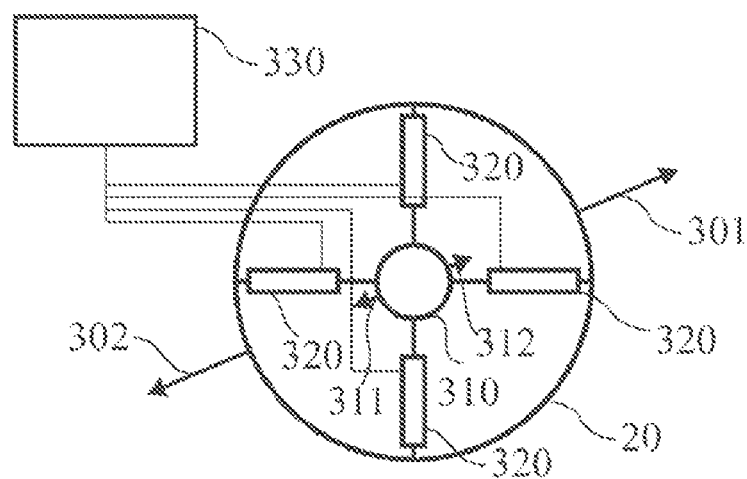
FIGS. 3a and 3b show schematic drawings illustrating an actively controlled mass of a mass damping system to reduce power vibration according to embodiments described herein.

Within FIG. 3a, a further embodiment of an actively controlled mass damping system according to further embodiments is described. The mass 310 is provided within tower 20. Four actuators 320 are connected to the mass 310 and to the shell of the tower. Thereby, the mass 310 can be actively moved with respect to the tower. Each of the actuators 320 is connected to controller 330. According to one embodiment, controller 330 controls the plurality of actuators 320 to allow an arbitrary movement of the mass 310 within the plane of the cross-section shown in FIG. 3a. According to different embodiments, each actuator is controlled by an individual controller. Thereby, the individual controllers may be synchronized by a master controller.

The controller and/or the drive mechanism for the mass in the form of actuators allow reaction times of 50 ms or less. According to further embodiments, the controller and/or the drive mechanism acts on the position, velocity and/or acceleration of the mass with reaction times in the µs range, typically 10-1000 µs. Thereby, the active control of the mass can be effectively employed and the mass reduction as compared to passive mass dampers can be further improved by the short reaction times.

Generally, vibrations of a wind turbine or the tower of a wind turbine may have velocity components along the wind direction or perpendicular to the wind direction. However, since the wind direction may change over time, whereby the nacelle rotates to adapt the wind turbine to the changing wind direction, arbitrary directions of vibration may occur during operation of the wind turbine.

The vibration of the tower 20 is indicated by arrows 301 and 302. In order to reduce the vibrations of the tower 20, the mass 310 is actively moved along arrows 312 and 311. Thereby, the movement of the mass 310 opposes the vibration of the tower 20. This is indicated by arrows 311 and 312.

According to one embodiment, as shown in FIG. 3a, four actuators 320 are provided to adapt the direction of the movement of the mass 310. In light of the above described changing wind direction or other influences that may affect the direction of the vibrations, the four actuators 320 can be used to actively control the movement of the mass in an arbitrary direction. According to other embodiments, three actuators can be provided in order to employ the movement in the plane of the cross-section shown in FIG. 3a.

Further, it is, for example, possible to provide one or two actuators in the event that a vibration in a fixed direction should be damped by the actively controlled mass damping system. Even in the event that arbitrary mass movements with respect to the tower are to be realized, a one dimensional mass movement can be used if this movement is rotatable with respect to the tower. Thus, according to one embodiment, an active control of a damping mass in an arbitrary direction with respect to the tower can be realized by one actuator for movement of the mass and one actuator for rotation of the damping system with respect to the tower. Alternatively, two or more actuators may be used for movement of the mass. The actuators provide drive mechanisms to actively control the position, velocity and/or acceleration of the mass with respect to the wind turbine and the tower, respectively.

As described above, for the embodiments described herein, the actuators for moving the lumped mass can be hydraulic or electric or a combination thereof.

As described above, the actively controlled lumped mass can reduce vibrations of the tower and/or the entire wind turbine, for example, at frequencies of 20 Hz or below. According to other embodiments, frequencies in the range of 0.1 to 10 Hz can be reduced with the actively controlled mass damper.

As described above, the reduced mass of an actively controlled mass damper system may be 100 kg to 3000 kg. According to another embodiment, the mass may be 200 kg to 400 kg. Generally, the size of the lumped mass depends on the size of the wind turbine. Thereby, according to one embodiment, the lumped mass may be 200 kg/MW to 500 kg/MW.

Figure 3B:
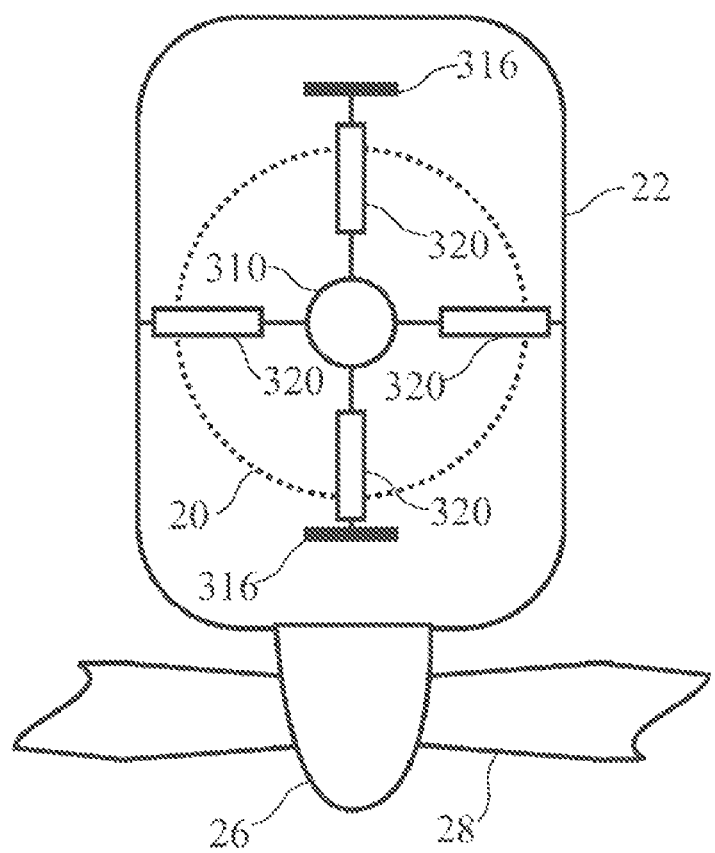

FIG. 3b illustrates the cross-sectional view of the nacelle 22 and a hub 26 and portions of rotor blades 28 connected therewith. Within the nacelle 22 holding portions 316 are provided. Within FIG. 3b two holding portions are shown. According to other embodiments, all actuators 320 may be connected to holding portions instead of the shell portion of the nacelle 22. Typically, the holding portions 316 are fixed to a base plate of the wind turbine in order to transfer the movement of the mass 310' to the wind turbine. According to the embodiments described with respect to FIG. 3b, the mass 310' is actively moved by the actuators 320. Thereby, corresponding embodiments as described with respect to FIG. 3a can be realized.

Figure 4:
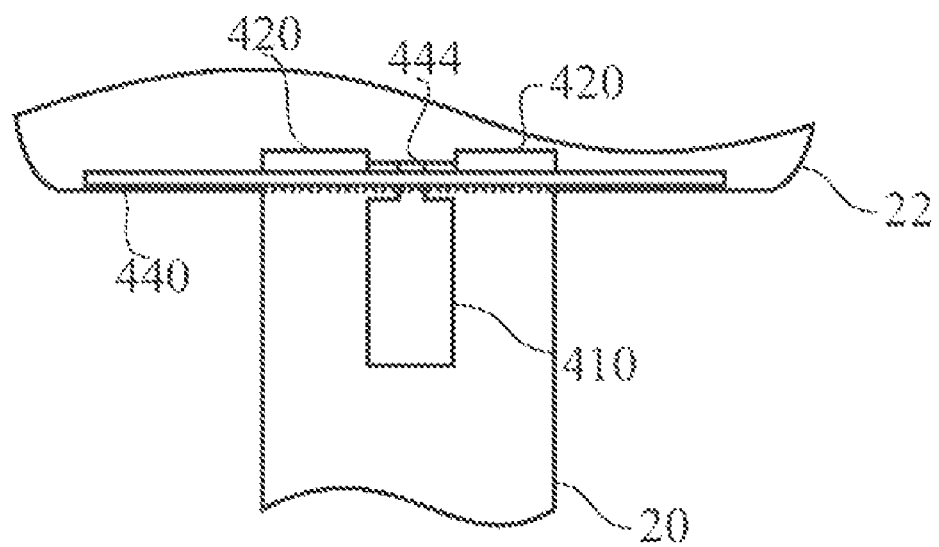
FIG. 4 shows a schematic drawing illustrating a wind turbine including an actively controlled mass damping system or an actively controlled vibration reduction system connected to a nacelle of the wind turbine according to embodiments described herein.

Within FIG. 4, a portion of the tower 20 and the portion of the nacelle 22 is shown. Within the nacelle 22 a base plate 440 is provided. Actuators 420 are mounted to the base plate and connected via connecting portion 444 to the lumped mass 410. The mass 410 is positioned below the nacelle 22 and is supported by the nacelle. If the actuators 420 are moved, the mass 110 is for example shifted with in the life-right-direction in FIG. 4.

As described above, according to one embodiment, additional actuators (not shown in FIG. 4) can be provided in order to provide the movement of the mass 110 in an arbitrary direction with respect to a horizontal plane. According to even further embodiments, the aspects disclosed with regard to other embodiments such as mass values, frequencies values, kinds of actuators, kinds of masses can be combined with the embodiments described with regard to FIG. 4.

Figure 5:
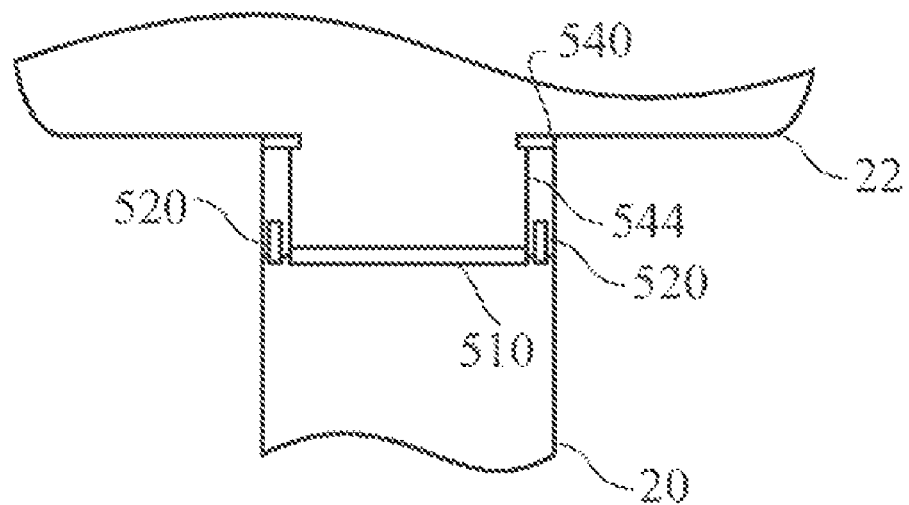
FIG. 5 shows a schematic drawing illustrating a wind turbine including an actively controlled mass damping system or an actively controlled vibration reduction system connected to a nacelle of the wind turbine according to embodiments described herein.

FIG. 5 illustrates further embodiments according to an arrangement of an actively controlled mass damper system in a wind turbine. Nacelle 22 is mounted on tower 20. The mass 510 hangs on holding portions 544. The holding portions are, for example, fixed to a flange 540. Thereby, the mass 510 is movable with respect to the tower 20. Actuators 520 are mounted to the shell of the tower and to the mass 510. Thus, the mass can be actively controlled with respect to the tower by actuators 520. According to even further embodiments, the aspects disclosed with regard to other embodiments such as mass values, frequencies values, kinds of actuators, kinds of masses can be combined with the embodiments described with regard to FIG. 5.

Figure 6:
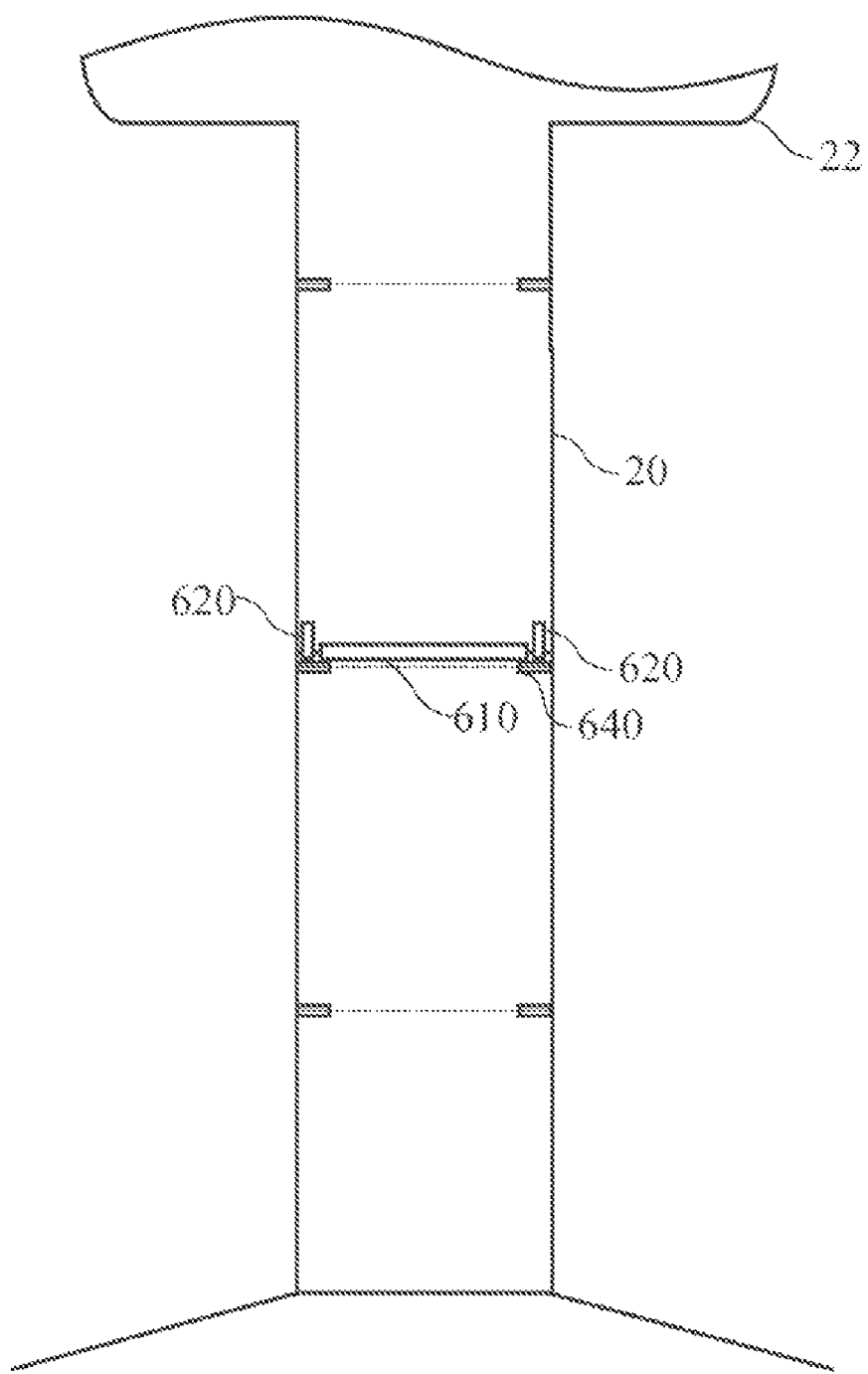
FIG. 6 shows a schematic drawing illustrating a wind turbine including an actively controlled mass damping system or an actively controlled vibration reduction system with the tower of the wind turbine according to embodiments described herein.

FIG. 6 illustrates further embodiments of an actively controlled mass damping system in a wind turbine. Nacelle 22 is provided on tower 20. As illustrated by the flanges 640, the tower 20 is provided by a plurality of sections. One section is connected to an adjacent section by the flanges. Within FIG. 6, the lumped mass 610 and the actuators 620 are connected to a flange 640. Thereby, the actively controlled mass damping system can be provided at the plurality of positions with in the tower 20. With in FIG. 6, the mass damping system is provided at about a center position of the tower.

The mass 610, the actuators 620, the control thereof, and other characteristics described with regard to other embodiments herein, can be modified for the actively controlled mass damping system shown in FIG. 6 in order to yield further embodiments of damping systems provided with in the tower 20 of the wind turbine. Thereby, it is possible to use a flange 644 mounting the actively controlled mass damping system. According to other embodiments, additional flanges may be provided for mounting of the mass damping system.

For the embodiments described herein, a tower vibration can be reduced by a factor of 2 to 5 by using an actively controlled mass damper. This description uses examples to disclose the invention, including the best mode, and also to enable any person skilled in the art to make and use the invention. The patentable scope of the invention is defined by the claims, and may include other examples.

Embodiments defined herein include inter alia, a damper system for damping vibrations of a wind turbine having a tower, a nacelle, and at least one rotor blade, the damper system. The damper system includes a mass for damping vibrations of a wind turbine, at least one actuator adapted for actively controlling the mass, wherein the at least one actuator is connected to a portion of the wind turbine and to the mass. This damper system can, according to another embodiment be defined by the mass being 100 kg to 3000 kg. Alternatively or additionally, according to further embodiments, the mass per power output of the wind turbine can be 100 kg/MW to 1000 kg/MW. According to further embodiments, an additional feature that can be combined with any of the other embodiments can be that the portion of the wind turbine to which the actuator is connected is the tower of the wind turbine. Thereby, according to further, individual embodiments, the mass can be positioned within the tower of the wind turbine and/or the mass can be supported by a base plate within the nacelle of the wind turbine.

According to further embodiments, a feature that can be combined with the embodiments described herein is that the at least one actuator can be hydraulic, electrical, or a combination thereof. According to further embodiments, a feature that can be combined with other embodiments described herein is that the at least one actuator can include at least three actuators. According to further embodiments, additionally, the at least three actuators can be connected to a controller for controlling at least one characteristic of the group consisting of: a position of the mass, a velocity of the mass, and an acceleration of the mass, wherein the controller can be adapted to control the mass with a response time of 50 ms or less.

According to further embodiments, a feature that can be combined with the embodiments described herein is that the damping system is adapted to reduce vibrations of the wind turbine with a frequency of 20 Hz or less.

Further embodiments that are described herein include inter alia a system for reducing vibrations of a tower of a wind turbine. The systems include a mass being movable with respect to the tower of the wind turbine, and a drive mechanism for actively controlling the mass movement with respect to the tower of the wind turbine. According to further embodiments, a feature that can be combined with other embodiments described herein is that the drive mechanism includes at least three a hydraulic actuators, at least three electric actuators or a combination of hydraulic and electric actuators. According to other embodiments, the mass can be 100 kg to 3000 kg and/or 100 kg/MW to 1000 kg/MW in relation to the power output of the wind turbine.

According to further embodiments, a feature that can be combined with other embodiments described herein is that the drive mechanism can be connected to a controller for controlling at least one characteristic of the group consisting of: a position of the mass, a velocity of the mass, and an acceleration of the mass, and wherein the controller is adapted to control the mass with a response time of 50 ms or less.

Further embodiments that are described herein include inter alia a method for reducing vibrations of a wind turbine. The method includes controlling the movement of a mass with respect to the wind turbine, the mass being located within the wind turbine, wherein the mass is actively controlled by a drive mechanism accelerating the mass with respect to the wind turbine. According to further embodiments, a feature that can be combined with other embodiments described herein is that the drive mechanism can accelerate the mass with a reaction time of 10 ms or less and/or that the drive mechanism is controlled by a controller receiving a vibrations state signal of the vibrations of the wind turbine.

What is claimed is:

1. A damper system for damping vibrations of a wind turbine having a tower, a nacelle, and at least one rotor blade, the damper system comprising:
   a mass for damping vibrations of the wind turbine; and
   at least one actuator adapted for actively controlling the mass, wherein the at least one actuator is connected to a portion of the wind turbine and to the mass, and wherein the mass is provided in the nacelle.

2. The damper system of claim 1, wherein the mass is between 100 kg and 3000 kg.

3. The damper system of claim 1, wherein the mass per power output of the wind turbine is between 100 kg/MW and 1000 kg/MW.

4. The damper system of claim 1, wherein the mass is supported by a base plate within the nacelle of the wind turbine.

5. The damper system of claim 1, wherein the at least one actuator is hydraulic, electrical, or a combination thereof.

6. The damper system of claim 1, wherein the at least one actuator comprises at least three actuators.

7. The damper system of claim 6, wherein the at least three actuators are connected to a controller for controlling at least one characteristic of the group consisting of: a position of the mass, a velocity of the mass, and an acceleration of the mass, and wherein the controller is adapted to control the mass with a response time of 50 ms or less.

8. The damper system of claim 1, wherein the damping system is adapted to reduce vibrations of the wind turbine with a frequency of 20 Hz or less.

9. A wind turbine comprising:
   a damper system according to claim 1.

10. A wind park comprising:
    at least two wind turbines according to claim 9.

11. A system for reducing vibrations of a tower of a wind turbine having a tower, a nacelle, and at least one rotor blade, the system comprising:
    a mass movable with respect to the tower of the wind turbine, wherein the mass is provided in the nacelle; and
    a drive mechanism comprising a plurality of actuators for actively controlling the mass movement with respect to the tower of the wind turbine, the plurality of actuators-configured to actively control the movement of the mass in an arbitrary direction.

12. The system of claim 11, wherein the drive mechanism comprises at least three actuators, the at least three actuators being hydraulic actuators, electric actuators, or a combination thereof.

13. The system of claim 11, wherein the mass is between 100 kg and 3000 kg.

14. The system of claim 11, wherein the mass per power output of the wind turbine is between 100 kg/MW and 1000 kg/MW.

15. The system of claim 11, wherein the drive mechanism is connected to a controller for controlling at least one characteristic of the group consisting of a position of the mass, a velocity of the mass, and an acceleration of the mass, and wherein the controller is adapted to control the mass with a response time of 50 ms or less.

16. A method for reducing vibrations of a wind turbine comprising
    controlling the movement of a mass with respect to the wind turbine, the mass being located within the nacelle of the wind turbine, wherein the mass is actively controlled by a drive mechanism accelerating the mass with respect to the wind turbine.

17. The method of claim 16, wherein the drive mechanism accelerates the mass with a reaction time of 50 ms or less.

18. The method of claim 16, wherein the drive mechanism is controlled by a controller receiving a vibrations state signal of the vibrations of the wind turbine.

* * * * *